United States Patent [19]

Schneider et al.

[11] 3,917,839

[45] Nov. 4, 1975

[54] TREATMENT OF ETHANOL WITHDRAWAL SYMPTOMS WITH METHERGOLINE

[75] Inventors: Cyril Schneider, Twickenham; Michael Douglas Hammond, Waterside, both of England

[73] Assignee: Miles Laboratories, Inc., Elkart, Ind.

[22] Filed: Jan. 17, 1974

[21] Appl. No.: 434,361

[30] Foreign Application Priority Data

Feb. 7, 1973  United Kingdom............. 05947/73

[52] U.S. Cl. ............. 424/261; 424/267; 260/285.5
[51] Int. Cl.² ................ A61K 31/48; A61K 31/445

[58] Field of Search............................. 424/261, 267

[56] References Cited
UNITED STATES PATENTS
3,238,211   3/1966   Camerino et al. .............. 424/267 X

*Primary Examiner*—Albert T. Meyers
*Assistant Examiner*—Daren M. Stephens
*Attorney, Agent, or Firm*—Myron B. Sokolowski

[57] ABSTRACT

Methergoline prevents or suppresses ethanol withdrawal symptoms in individuals abstaining from ethanol in a post-intoxicated state.

5 Claims, No Drawings

TREATMENT OF ETHANOL WITHDRAWAL SYMPTOMS WITH METHERGOLINE

BACKGROUND OF THE INVENTION

1. Field of the Invention

This invention relates to therapy of ethanol withdrawal symptoms in individuals deprived of or abstaining from ethanol after ethanol intoxication. For convenience, the terms ethanol withdrawal symptoms and ethanol are used interchangeably with withdrawal symptoms and alcohol, respectively, throughout the text of this specification.

Prevention or suppression of withdrawal symptoms currently is part of therapeutic regimens directed at the cure of a clinical entity known as alcoholism. Although the latter is a complex disease comprising psychological as well as physical aspects, it always involves a varying degree of physical dependence on alcohol caused by a chronic abuse thereof. A common therapeutic regimen involves abstinence from ethanol to reverse the physical dependence thereon and treatment of withdrawal symptoms precipitated by such abstinence with a variety of drugs. Pentobarbital, chloral hydrate, paraldehyde and chlordiazepoxide are generally used to prevent or suppress such symptoms (Granville-Grossman, Recent Advances in *Clinical Psychiatry*, J. & A. Churchill Co., Ltd., London, pp. 129–139 [1971]). Although phenothiazines, such as promazine and chlorpromazine, are indicated in cases in which the physical dependence is moderate, there use is limited in severe cases and is ineffective to prevent delirium tremens or seizures (Thomas and Freedman, J. Am. Med. Ass'n., 188: 316 [1964]; and, Golbert et al., J. Am. Med. Ass'n., 201: 99 [1967]).

DESCRIPTION OF THE PRIOR ART

Methergoline, or D-8β-[(carbobenzoxyamino)-methyl]-1,6-dimethyl-10α-ergoline, has the following structural formula:

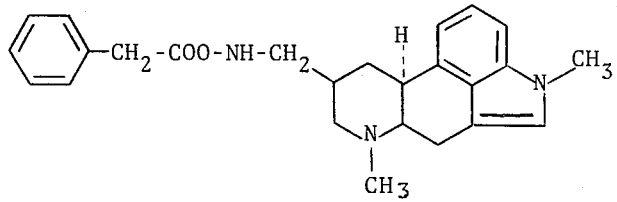

Bernardi et al. have reported the synthesis of methergoline (Gazz. Chim. Ital. 94: 936 [1964]), and Camerino et al. have disclosed its utility in the treatment of migraine and terminal neuralgia (U.S. Pat. No. 3,238,211 [1966]).

SUMMARY OF THE INVENTION

The subject matter of this invention is a new therapeutic use of methergoline in the prevention or suppression of ethanol withdrawal symptoms in an individual abstaining from or deprived of ethanol after intoxication therewith. The term individual, as utilized in the text of this specification and in the claims, refers either to a human being or to a mammal serving as a model for a human being in a laboratory experiment.

Abrupt discontinuation of and subsequent abstinence from ethanol in an individual after ethanol intoxication precipitate withdrawal symptoms, the intensity of which depends upon the degree and duration of the intoxication.

Mild symptoms of withdrawal occur after a single event of several or more hours of intoxication and may include headache, dizziness, weakness, perspiration, mild gastro-intestinal disturbances, and general malaise (Goldberg, Q. J. Stud. Alcohol. Suppl. 1: 37 [1961]).

Chronic intoxication with ethanol produces a state of physical dependence thereon, commonly referred to as alcoholism (Isbell et al., Q. J. Stud. Alcohol, 16: [1955]). In individuals physically dependent upon ethanol, withdrawal symptoms occur within a few hours of ethanol abstinence and commonly include tremor, nausea, moderate-to-severe gastro-intestinal disturbances, anxiety, insomnia, hallucinations, and even delirium and seizures. (Victor and Adams, Res. Publs. Assn. Res. Nerv. Ment. Dis., 32: [1953]).

A suitable model of assessing the efficacy of drugs in the treatment of alcohol dependence in mice has been published in the literature (Hammond and Schneider, Brit. J. Pharmacol., 47: 667P [1973]). The characteristic withdrawal symptoms precipitated in ethanol-dependent mice upon deprivation of alcohol are similar to those observed in mice given drugs which produce hallucination in man (Corne and Pickering, Psychopharmacologia [Berl.], 11: 65 [1967]).

An unexpected new therapeutic use of methergoline in the prevention or suppression of withdrawal symptoms has been discovered utilizing the above model. Specifically, this invention involves the prevention or suppression of ethanol withdrawal symptoms in an individual abstaining from ethanol after intoxication therewith by administration to the individual of an effective amount of methergoline to prevent or suppress the withdrawal symptoms. The amount of methergoline required to effect such therapy ranges from about 1.15 mg/kg to about 2.69 mg/kg, and the median effective dose ($ED_{50}$) required to prevent or suppress withdrawal symptoms is 1.8 mg/kg when methergoline is administered orally; if methergoline is administered subcutaneously, the dose ranges from about 0.12 mg/kg to about 1.7 mg/kg, and the $ED_{50}$ is 0.43 mg/kg.

Methergoline may be administered when the first symptoms of ethanol-withdrawal appear or, prophylactically, 8-16 hours after a previous ingestion of ethanol.

DESCRIPTION OF THE PREFERRED EMBODIMENTS

Male T/O mice weighing 23–25 g each received ethanol orally or in vapor form. In the case of oral administration, the mice were given increasing doses of ethanol (4, 5, 6 and 7 g/kg on each of four successive days by intragastric injection). The ethanol was used in the form of a 40% weight/volume solution obtained by diluting 96% ethanol with distilled water. Alternatively, the mice were exposed to ethanol vapor at a concentration of 20 mg per liter of air continuously for 8 days. At the end of each treatment the mice were segregated into groups of five and colored to facilitate counting. Individual mouse headtwitch scores were recorded for a period of four minutes. Characteristic ethanol withdrawal head-twitches were observed which, the case of untreated mice, reached a peak intensity about 12 hours after the blood ethanol concentrations had fallen to zero. The compounds under test were given 1 hour before the observations. The dose of each drug tested required to discoordinate 50% of the animals ($FD_{50}$) was compared with the dose that reduced to 50% the proportion of mice showing head-twitches ($ED_{50}$). The results obtained are shown in the following table, in which doses are given as mg/kg orally (PO) or subcutaneously (SC).

TABLE

| Compound Under Test | Route | ED 50 (with 95% fiducial limits) | FD 50 (with 95% fiducial limits) | FD 50 / ED 50 |
|---|---|---|---|---|
| Ethanol | PO | 3990 (2610–6410) | 2500 (2020–3140) | 0.6 |
| Pentobarbitone Sodium | PO | 231 | 91 (36–229) | 0.4 |
| Methergoline | PO | 1.8 (1.15–2.69) | >64* | >35 |
| Methergoline | SC | 0.43 (0.12–1.7) | NT | — |

*10% discoordination produced at 64 mg/kg
NT = not tested
PO = orally
SC = subcutaneously These figures show that methergoline is very much more effective in reducing the symptoms of ethanol-withdrawal in the treated mice than was either ethanol itself or pentobarbitone sodium (a drug sometimes used for reducing symptoms of ethanol-withdrawal in man). It will be noted in particular that methergoline has this valuable effect at dosages very much lower than those required to produce discoordination in the animals treated. This again is in marked contrast to the effect of ethanol itself and pentobarbitone sodium.

What is claimed is:

1. A method of preventing or suppressing ethanol withdrawal symptoms in an individual physically dependent on ethanol, which method comprises:
   administering to said individual an effective amount of methergoline to prevent or suppress said symptoms.

2. A method as in claim 1 wherein said amount is from 1.15 mg/kg to 2.69 mg/kg, administered orally.

3. A method as in claim 2, wherein said amount is 1.8 mg/kg.

4. A method as in claim 1, wherein said amount is from 0.12 to 1.7 mg/kg, administered subcutaneously.

5. A method as in claim 4, wherein said amount is 0.43 mg/kg.

* * * * *